United States Patent [19]

Ravani et al.

[11] 4,084,516

[45] Apr. 18, 1978

[54] FOLDABLE SLIDABLE VEHICLE END ENCLOSURE

[75] Inventors: Chandrakant D. Ravani, Farmington; James C. Robertson, Ypsilanti; Jaroslaw J. Rostafinski, Ferndale, all of Mich.

[73] Assignee: Portec, Inc., Oak Brook, Ill.

[21] Appl. No.: 780,226

[22] Filed: Mar. 22, 1977

[51] Int. Cl.[2] .................... B60J 5/06; B60J 5/10; B61D 17/06; B61D 19/00

[52] U.S. Cl. .................... 105/368 R; 105/376; 105/378; 105/410

[58] Field of Search .................... 49/366, 367, 370; 105/339, 340, 376, 368 R, 378, 410, 437; 161/197, 213; 296/55, 147, 148

[56] References Cited

U.S. PATENT DOCUMENTS

| | | | |
|---|---|---|---|
| 1,049,655 | 1/1913 | Boller et al. | 105/376 X |
| 1,757,860 | 5/1930 | Hall et al. | 296/148 |
| 2,009,895 | 7/1935 | Madden et al. | 105/376 |
| 2,690,141 | 9/1954 | King | 105/368 R X |
| 3,017,840 | 1/1962 | Fairweather | 105/368 R |
| 3,029,747 | 4/1962 | Shaver | 105/376 |
| 3,073,261 | 1/1963 | Olglesby | 105/376 |
| 3,854,425 | 12/1974 | Allen | 105/368 R |
| 3,911,831 | 10/1975 | Blunden | 105/368 |
| 3,938,446 | 2/1976 | Seitz et al. | 105/378 X |
| 3,977,123 | 8/1976 | Clay, Jr. et al. | 105/368 R X |
| 3,995,563 | 12/1976 | Blunden | 105/368 R X |
| 3,996,860 | 12/1976 | Ravani et al. | 105/368 R |

FOREIGN PATENT DOCUMENTS

| | | | |
|---|---|---|---|
| 491,563 | 3/1953 | Canada | 296/55 |

*Primary Examiner*—Drayton E. Hoffman
*Assistant Examiner*—Howard Beltran
*Attorney, Agent, or Firm*—Emory L. Groff, Jr.

[57] ABSTRACT

An enclosure for a vehicle end opening disposed between two side walls includes a pair of bi-fold door assemblies, each comprising inner and outer panels hingedly connected to one another with the outer edges of the innermost panel in turn hingedly connected to a hinge rod normally disposed adjacent the outer limits of the end opening. Intermediate lock means are included with each pair of door panels for selectively precluding relative displacement therebetween and when actuated allows of folding of each pair of door panels to provide a collapsed juxtaposed relationship following which the folded door assembly may be pivoted about the hinge rod 90° or until parallel to the vehicle side walls. The hinge rod supporting each door assembly is in turn supported and guided by hanger and track means extending longitudinally of the vehicle whereby the folded and pivoted door assembly may be displaced in a sliding manner to a retracted or stored position within the interior of the vehicle sides, at which point locking means are actuated to retain the door assembly secured.

15 Claims, 15 Drawing Figures

FOLDABLE SLIDABLE VEHICLE END ENCLOSURE

This invention relates generally, to a displaceable closure construction for the end opening of a vehicle and more particularly, to an end enclosure especially adapted for use in railway cars as utilized for the transportation of automobiles.

End enclosures for railway cars are well known. U.S. Pat. No. 3,996,860 issued Dec. 14, 1976, to the assignee of the instant invention illustrates an example of a vehicle end enclosure comprising a pair of bi-fold door assemblies intended to provide security at the ends of a railway car of the same general type as proposed to be protected by the enclosure structure of the present invention. A unique arrangement has now been devised comprising a pair of bi-fold door assemblies of a relatively simple construction and which are relatively inexpensive to produce while at the same time offering a high degree of security against unauthorized access to the interior of the railway car.

It will be understood that the end enclosure of the present invention may be employed in a railway car of any suitable well known construction, even though the example illustrated in the appended drawings relates to an automobile transport rail car of the tri-level type. Important features now set forth include the combination of a pivotal displacement between each pair of bi-fold door panels together with a concurrent 90° displacement of the outermost one of each door panel about a movable main hinge rod following which each folded pair of door panels are longitudinally displaced, as a unit, into the confines of the car interior in a direction parallel to the car side walls, which latter action is made possible by the mounting of each entire bi-fold door assembly upon a sliding hanger assembly cooperating with track means fixedly disposed relative the car framing. Positive locking means are provided for securing the folded and longitudinally displaced door assemblies in the referenced stored position as well as for locking each pair of cooperating door panels in a co-planar relationship when in the closed position and sealing off the car end opening.

Many automobile transport rail cars, especially the tri-level type, are covered over the top by means of a roof structure since there has been a significant record of considerable damage to lading, much of it due to vandalism, when automobiles are transported in an open top rail car and accordingly, the present invention proposes to include a roof enclosure. Clearance restrictions and a desire to minimize wind resistance usually dictate that such a roof structure must include angularly disposed or inclined side walls and such an arrangement has often restricted the ability to provide for adequate security in the area of the clearance between the top of the enclosure door panels and the roof top. In the case of the referenced U.S. Pat. No. 3,996,860, this problem was solved by eliminating the car side wall ladder steps, or at least the uppermost ones of said steps, and instead providing ladder steps on one of the door panel faces, which door panel face would be disposed on the car outside wall only when the door panels were in the open or stored position. Such an arrangement could not carry over to the present invention inasmuch as the instant bi-fold door assemblies are fully disposed within the interior of the car side walls when in the open storage position and accordingly, especially configured security panels are now associated with each outer door panel and are automatically disposed in a blocking position when the end enclosure is in the closed position to preclude unauthorized access into the interior of the railway vehicle by an individual climbing up the car ladder steps on the car side wall.

Accordingly, one of the primary objects of the present invention is to provide an improved vehicle end enclosure including a pair of bi-fold door assemblies, each entirely supported by a sliding hanger assembly permitting of displacement of the folded door panels into a stored position within the interior of the vehicle in a direction parallel to the side walls thereof.

A further object of the present invention is to provide an improved vehicle end enclosure including a pair of bi-fold door assemblies each comprising a pair of hingedly connected panels further including a locking assembly substantially axially aligned with hinge means connecting the pairs of door panels and which is actuated to immobilize each pair of door panels in a co-planar disposition when closing the car end opening.

An additional object of the present invention is to provide an improved vehicle end enclosure including a pair of door panels hingedly connected to one another with the outer edge of one of the panels further hingedly connected to a hinge rod, the latter of which is supported by a hanger assembly mounted for sliding longitudinal movement within the interior of the car.

Still another object of the present invention is to provide an improved vehicle end enclosure including a pair of bi-fold door assemblies, each comprising an outer panel pivotally displaceable 90° prior to being longitudinally displaced into the interior of the car, after which snap-fitting locking means is automatically actuated to retain the door assembly therewithin.

A further object of the present invention is to provide an improved vehicle end enclosure for use with a vehicle having a raised roof and wherein a pivotal and slidable door assembly normally closes the vehicle end opening with a security panel projecting upwardly from the door assembly closing off a substantial portion of the space from the top of the door assembly to the top of the roof and wherein upon opening of the door assembly and displacing same within the interior of the car parallel to the side walls thereof, the security panel is juxtaposed the sides of the roof structure in a out-of-the-way manner.

With these and other objects in view which will more readily appear as the nature of the invention is better understood, the present invention consists in the novel construction, combination and arrangement of parts hereinafter more fully described, illustrated and claimed.

A preferred and practical embodiment of the invention is shown in the accompanying drawings in which.

Similar reference characters designate corresponding parts throughout the several figures of the drawings.

Figure 1:
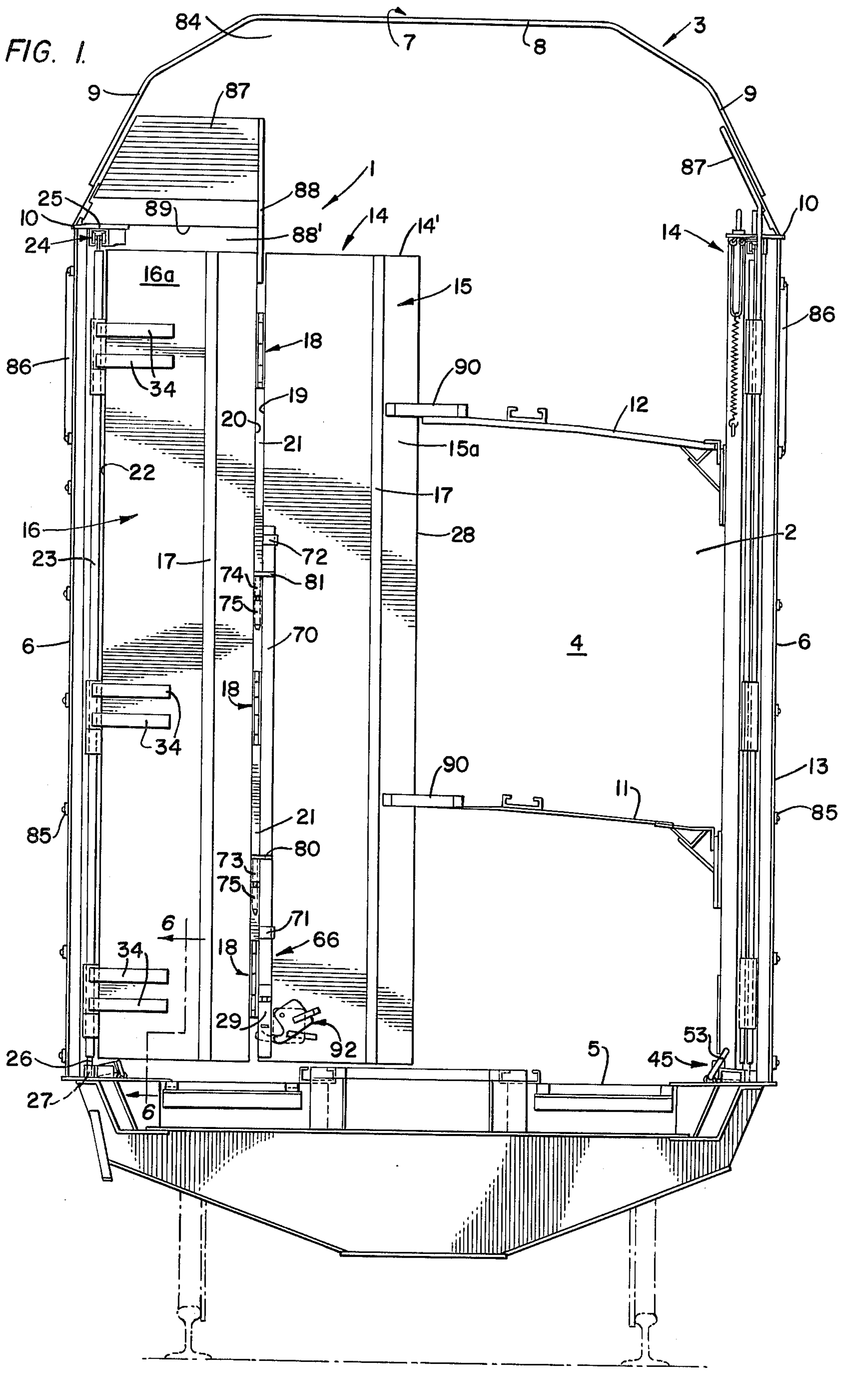
FIG. 1 is an end elevation of a railway car provided with the end enclosure of the present invention and illustrates one bi-fold door assembly in a closed position and the other bi-fold door assembly in the open or stored position.

Referring now to the drawings, particularly FIG. 1, the present invention will be understood to comprise an end enclosure, generally designated 1, adapted to substantially fully seal off or close the end opening 2 of a vehicle such as the rail car generally designated 3. The interior 4 of the car is bounded by a floor 5, two side walls 6—6 and preferably also a roof 7 having a raised top section 8 and lateral downwardly inclined or angled side sections 9—9 attached to the top edges 10 of the two car side walls 6. Rail cars formed with a body and having end openings are usually employed for transporting vehicles such as automobiles and accordingly, the car 3 may be provided with interior substantially horizontally disposed decks such as the intermediate deck 11 and upper deck 12, the former of which may have end portions hingedly mounted (not shown) to permit limited elevation for the purpose of facilitating the loading and unloading of vehicles within the interior 4 and upon the lower deck or floor 5.

The end enclosure 1 of the instant invention comprises means intended to substantially completely close or seal off the end opening 2 adjacent the transverse plane formed by the car side wall end edges 13—13 in the area extending from the car floor 5 to the level of the side wall top edges 10—10. This enclosure includes a pair of bi-fold door assemblies, each generally designated 14 and with each said assembly serving to enclose approximately one-half the area of the end opening.

FIG. 1 of the drawings illustrates the left-hand bi-fold door assembly 14 as it appears when in the closed position and will be seen to include an inner panel 15 and an outer panel 16 adjacently disposed to one another and located in a common plane when in this closed position. The body of each of the panels 15 and 16 may be constructed in any suitable well known manner such as shown most clearly in FIG. 4 wherein it will be seen that each panel includes an outside face 15*a*, 16*a*, and an inside face 15*b*, 16*b*, respectively, and wherein each of said faces may be provided with one or more vertically disposed reinforcing channels 17. The pair of panels comprising each bi-fold door assembly 14 are joined to one another by means of a plurality of intermediate hinge assemblies, generally designated 18, such that when disposed in the closed co-planar position the outer edge 19 of the inner panel 15 will be slightly spaced apart from the inner edge 20 of the outer panel 16. A specific description of the construction of the hinge assemblies 18 will be covered hereinafter, it being sufficient to realize at this point that the hinge assembly 18 is not of the continuous hinge pin type but rather comprises a plurality of spaced apart units such that a definite vertical clearance 21 is provided intermediate the three separate hinge assemblies 18.

The outer edge 22 of the outer panels 16 is pivotally attached to and supported by slidably displaceable hinge means comprising a vertically disposed main hinge rod or pipe 23 which is supported by and suspended from overhead track means or a guide member 24 attached to a fixedly disposed top plate 25. The lower portion 26 of this hinge rod 23 forms a bottom door guide rod and is captively disposed within a bottom door track or guide channel 27 extending longitudinally of the vehicle 3 or parallel to the side walls 6 similar to the disposition of the aforementioned overhead track or guide member 24. With the foregoing in mind, it will be appreciated that the entire bi-fold door assembly 14 is supported by the hinge rod 23 such that when in the closed position as shown in the left-hand portion of FIG. 1 of the drawings the inner edge 28 of the inner panel 15 will be vertically disposed at a point substantially midway of the width of the end opening 2.

When it is desired to move the bi-fold door assembly 14 from the closed position to its stored or open position the intermediate portion of the door assembly 14 is drawn outwardly away from the vehicle 3 by means of an appropriate handle 29 attached to one of the panels adjacent the clearance 21 and in view of the construction of the hinge assembly 18 the inner edge 20 of the outer panel 16 and the outer edge 19 of the inner panel 15 will be displaced outwardly or away from the end opening 12 or interior 4 of the car 3 and transcribe an arcuate path about the axis of the hinge rod 23 until the axis of the hinge assembly 18 has been displaced approximately 90° about the hinge rod 23, at which time the two panels 15 and 16 may be folded one against the other such that the inside faces 15*b* and 16*b* thereof are juxtaposed one another and the combined or folded panels 15 and 16 are both disposed parallel to the adjacent car side wall 6. At this point the two door assembly panels will be as illustrated by the broken line position shown in FIG. 4 of the drawings. Thereafter, the folded door assembly 14 is pushed longitudinally toward the interior 4 of the car in a direction parallel with the adjacent car side wall 6 until the door assembly is fully disposed within the car interior and will at that time appear as in the right-hand portion of FIG. 1 and as shown in FIG. 2 of the drawings.

The structure permitting of the foregoing longitudinal sliding displacement of the folded door assembly may now be described with particular reference being made to FIG. 2 of the drawings. The main hinge rod or pipe 23, although slidably displaceable longitudinally of the vehicle 3, is nevertheless fixed against any angular displacement or rotation itself. It will be seen that this rod 23 is fixedly attached to and supported by a horizontally extending door assembly hanger member 29 disposed beneath the overhead track member 24. Vertical stability and additional support is given to the lower portion of the rod 23 by means of the diagonal brace 30 having its upper end 31 attached to the rear 32 of the hanger member 29, while its lower end 33 is suitably secured to the lower portion of the hinge rod 23. The outer panel 16 of each bi-fold door assembly 14 is connected to the sliding hanger assembly H by means of a plurality of hinge straps 34 suitably affixed to the outside face 16a of the panel 16 on the one end and having their other ends extending beyond the door panel outer edge 22 and fixedly attached to a pivot or hinge bushing 35 rotatably mounted upon the main hinge rod 23. Disposed beneath each pivot bushing 35 is a support collar 36 which is fixedly attached to the hinge rod 23 and upon which each pivot bushing 35 is supported.

From the foregoing it will be seen that the entire support of each bi-fold door assembly 14 is derived from the vertically disposed main hinge rod 23, which rod 23 is in turn at all times being suspended in a vertical plane by the sliding hanger assembly H. The suspension of the hanger member 29 will be most readily understood from a review of FIGS. 1, 2 and 3, wherein it will be seen that a plurality of hanger straps 37 extend upwardly from the hanger member 29 through a central bottom slot 38 formed in the overhead track member 24. The track member includes a pair of spaced apart depending side walls 39—39 each terminating in an inwardly directed bottom rail 40 and upon which travel wheels or rollers 41 disposed in pairs on opposite sides of each hanger strap 37 and which are connected to the hanger straps by means of a suitable transverse shaft 42. Each pair of adjacent wheels 41 comprise a trolley unit 43 and as shown in FIG. 2 of the drawings a plurality of such units 43 are employed to suitably support the weight of each entire bi-fold door assembly 14.

Figure 2:
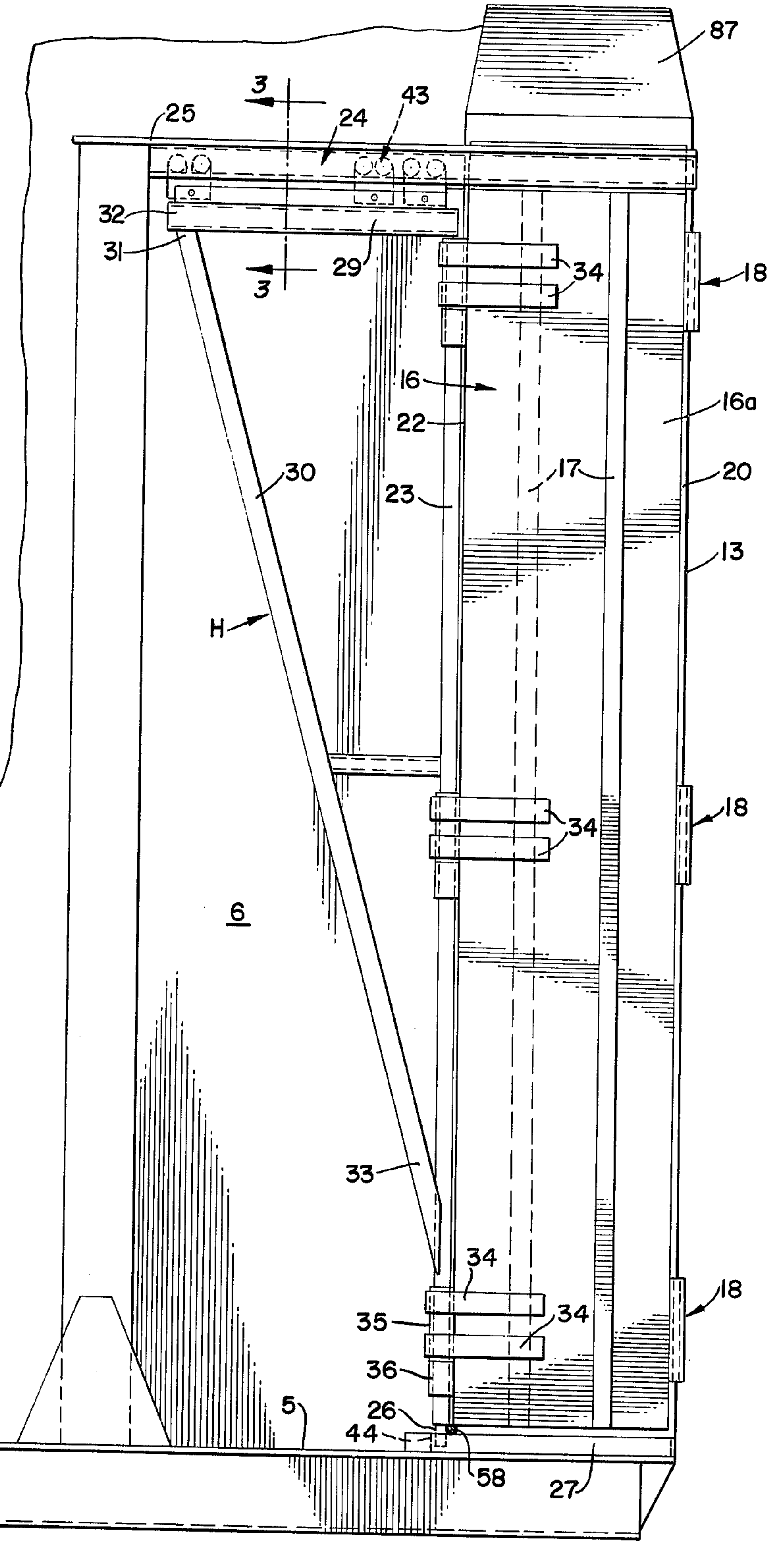
FIG. 2 is a side elevation of one of the bi-fold door assemblies as it would appear when in the open or stored position.
Figure 3:
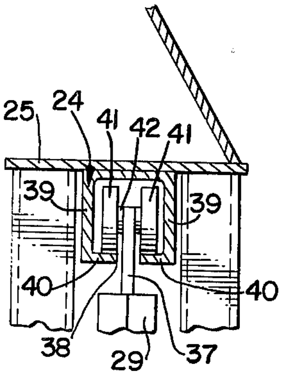
FIG. 3 is an enlarged fragmentary cross-sectional view taken along the lines 3—3 of FIG. 2.

From the foregoing it will be appreciated that the length of the overhead track member 24 is sufficient to allow displacement of the rearwardmost trolley unit 43 into the car interior when each door assembly 14 is in the stored or open position such as shown in the right-hand portion of FIG. 1 or in FIG. 2. The bottom door track channel 27, on the other hand, need only extend rearwardly into the interior of the vehicle a sufficient distance to permit the bottom guide rod 26 of the hinge rod 23 to assume that position which will ensure full displacement of the entire folded door assembly 14 into the car interior. Accordingly, a suitable storage stop member 44 defines the rearwardmost limit of travel of the guide rod 26 within the bottom track channel 27.

Figure 6:
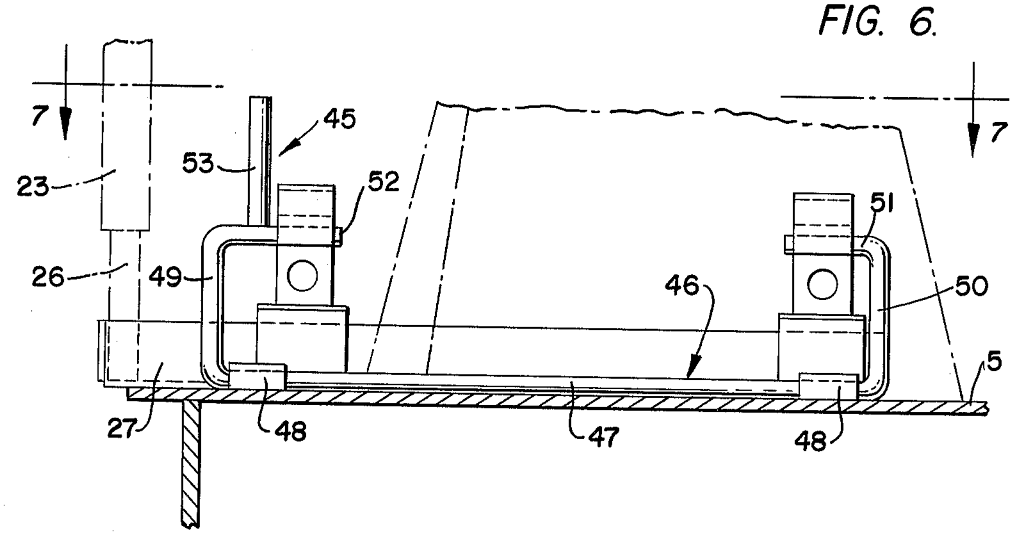
FIG. 6 is a partial vertical view taken along the line 6—6 of FIG. 1 and illustrates the lock means for retaining each door assembly in an open or stored position.

Positive means are provided to secure the folded and longitudinally displaced door assembly 14 in the stored position within the confines of the vehicle interior. This means comprises the storage lock assembly, generally designated 45, and shown most clearly in FIGS. 6–8 of the drawings. This lock assembly includes an actuating rod 46 having a horizontally disposed base portion 47 suitably journalled to preclude longitudinal or transverse displacement such as by the pivot or mounting bushings 48—48 affixed to the vehicle floor 5 adjacent the upwardly extending front angular portion 49 and rear angular portion 50. Extending from the distal portion of the angular portion 50 is an offset lock actuating portion 51 while a forward offset lock actuating portion 52 extends rearwardly from the distal portion of the forward angular portion 49 such that the two offset actuating portions are axially aligned and disposed parallel to the longitudinal base portion 47.

Figure 7:
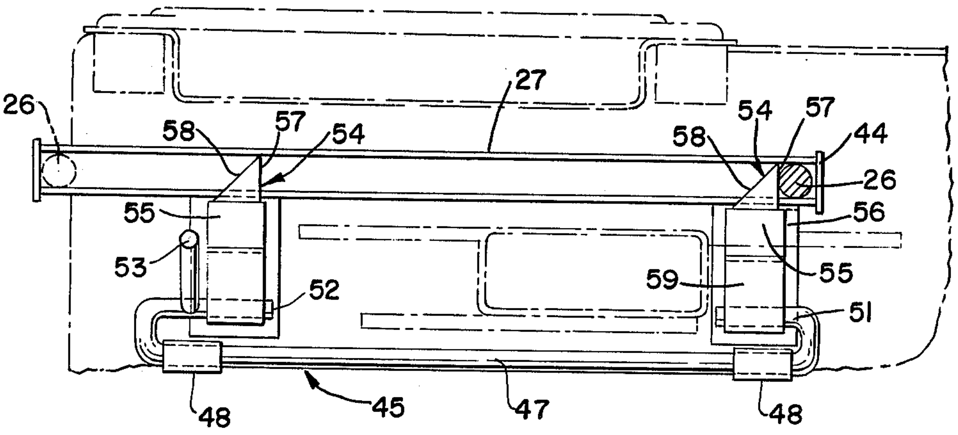
FIG. 7 is a horizontal view, partly in section, taken along the line 7—7 of FIG. 6.

A suitable handle 53 projects upwardly from the forward offset lock actuating portion 52 to provide adequate leverage for the manipulation of the storage lock assembly 45 which is intended to regulate the displacement of a pair of latch bolts 54, one each of which is associated with each of the actuating portions 51 and 52. Each bolt 54 is housed within a barrel 55, the latter of which is fixedly attached relative the bottom door track channel 27 such as by means of the bracket 56. Suitable spring means (not shown) normally biases both of the latch bolts 54 to the position shown in FIGS. 7 and 8 of the drawings wherein it will be seen that the lock face 57 of the bolts is disposed in an overlying relationship relative the top of the channel 27 and in a position perpendicular to the longitudinal extent of the channel. The face 57 of the rearmost latch bolt 54 is located a sufficient distance from the storage stop member 44 to allow positioning of the hinge rod bottom guide member 26 therebetween in a captive manner as shown most clearly in FIG. 7 of the drawings. With the realization that the two latch bolts 54 are normally constantly urged to the position as shown in the drawings, it will follow that as an operator displaces a folded door assembly 14 rearwardly into the vehicle interior 4 by applying pressure against the outwardly exposed edges 19 and 20 of the two folded panels 15 and 16, the main vertical hinge rod 23 will be urged rearwardly with a concurrent displacement of the door assembly hanger member 29 at the top of the rod 23 and the door guide rod 26 at the bottom thereof until such time as the guide rod 26 strikes the rearmost latch bolt cam surface 58, at which time continued rearward movement of the door assembly will transversely displace the latch bolt 54 against its inherent spring pressure until the guide rod 26 is in the position as shown in FIG. 7 of the drawings, at which time the latch bolt 54 will be spring urged to the illustrated locked position such that the door assembly will be securely retained in the storage position.

Figure 8:
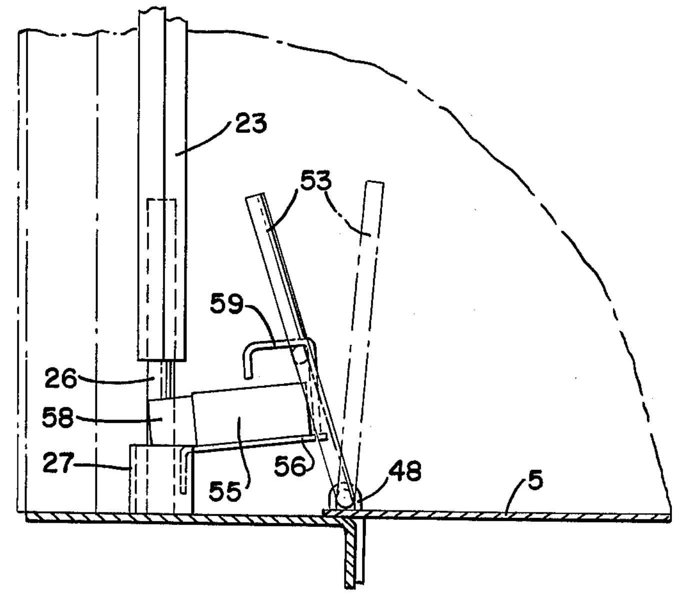
FIG. 8 is a fragmentary front elevation of the structure shown in FIG. 6.

When it is desired to extract the door assembly from this storage position the operator may slide the folded doors outwardly only after the handle 53 of the lock assembly 45 has been displaced from the full line position of FIG. 8 to the broken line position thereof, which action, translated through a corresponding angular displacement of the actuating portions 51 and 52, produces a retraction or transverse displacement of the two latch bolts 54 as the respective control brackets 59, 59 are engaged by the actuating portions 51–52, it being understood that the control brackets 59 are in turn fixed to the other ends of the two latch bolts 54—54.

The aforedescribed displacement of each door assembly from its closed to its stored position is facilitated and regulated by a spring member 60 comprising a suitable elastic element such as a stretch cord having its free end suitably attached to the inner panel 15 adjacent its top edge 14' by a door anchor 61. This construction is shown most clearly in FIGS. 4 and 5 of the drawings wherein it will be noted that the opposite portion of the spring member 60 passes through a fixed guide element 62 secured to any convenient stationary structure of the vehicle 3. Beyond the guide element 62 the other end of the spring member 60 is connected to a spring device such as a tension spring 63, the latter of which has its distal portion secured to a fixed anchor 64 secured to a suitable vehicle frame support member 65 at a point located at a lower elevation than the fixed guide element 62.

Figures 4, 5:
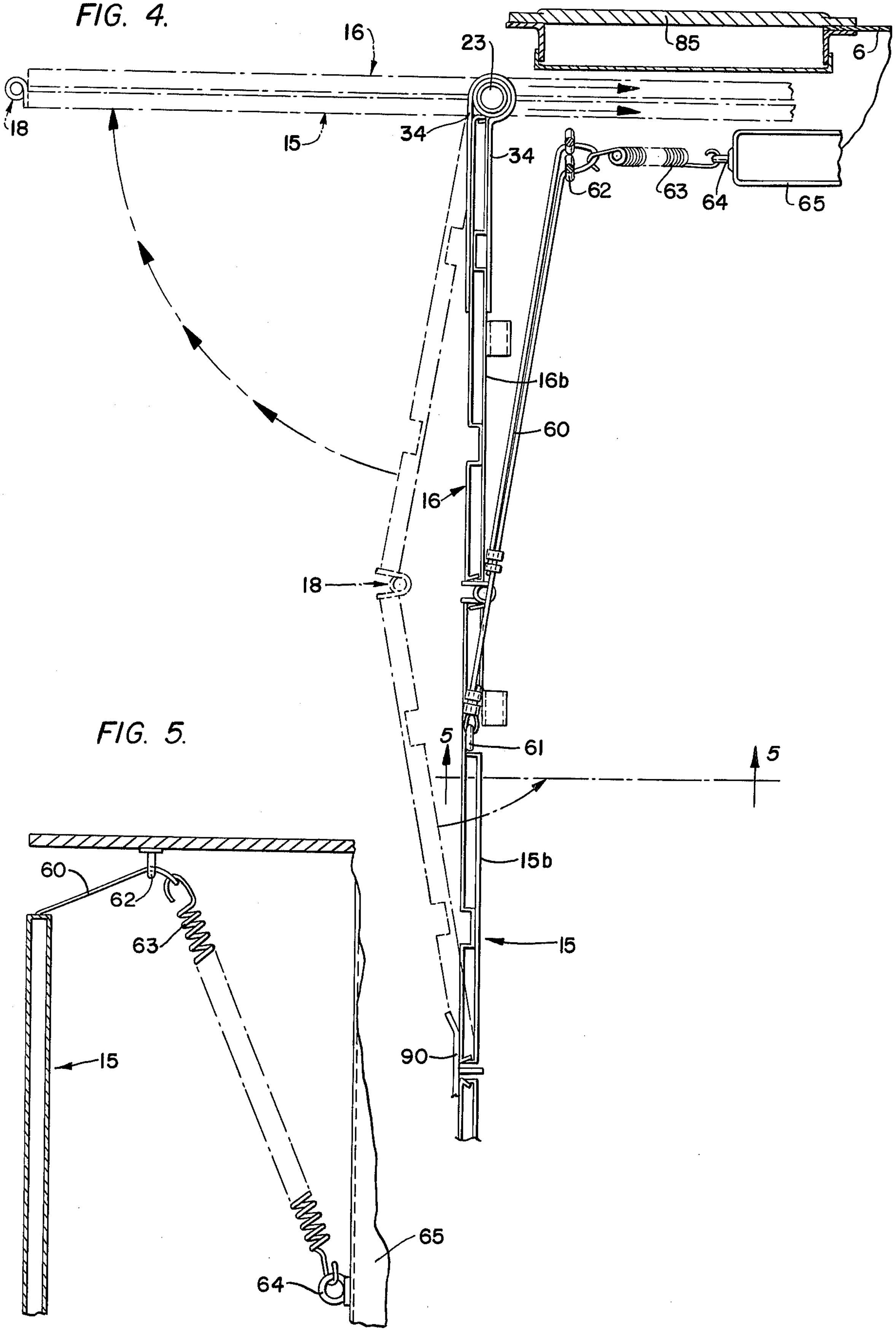
FIG. 4 is a partial top plan view, partly in section, and illustrates spring assist and restraining means associated with each of the door assemblies.
FIG. 5 is a partial vertical sectional view taken along the line 5—5 of FIG. 4.

With the foregoing construction in mind it will be understood that when the bi-fold door assembly 14 is in the closed position as reflected by full lines in FIG. 4, the members 60 and 63 will be under substantial tension and since the anchored end of the spring member 60 is affixed to the inner panel 15 at a point spaced from the hinge assemblies 18 it will be apparent that the inner panel 15 will be constantly urged in a counter-clockwise direction about the hinge assemblies 18 as the outer panel 16 is displaced in a clockwise direction about the main vertical hinge rod 23. Thus, the spring member 60 and spring device 63 serve as a spring assist to facilitate the folding of the inner panel 15 inside face **15*b* toward the outer panel inside face 16*b* as the subsequently folded door panels are moved to the broken-line position of FIG. 4 and this same spring assist construction will thereafter at least initially facilitate the subsequent sliding displacement of the folded door assembly 14 into the car interior 4** and towards the storage position.

Figure 12:
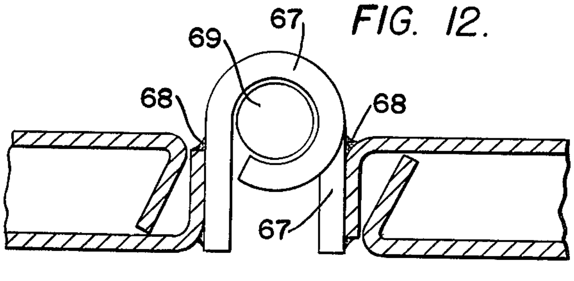
FIG. 12 is a transverse sectional view taken along the line 12—12 of FIG. 9.
Figure 13:
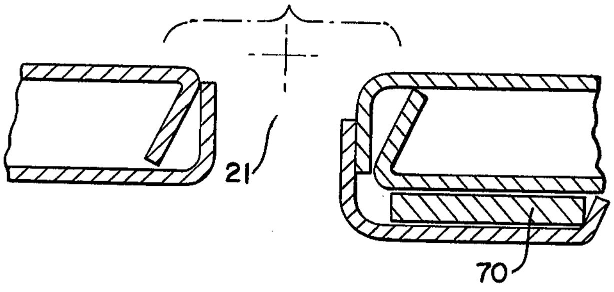
FIG. 13 is a transverse sectional view taken along the line 13—13 of FIG. 9.
Figure 14:
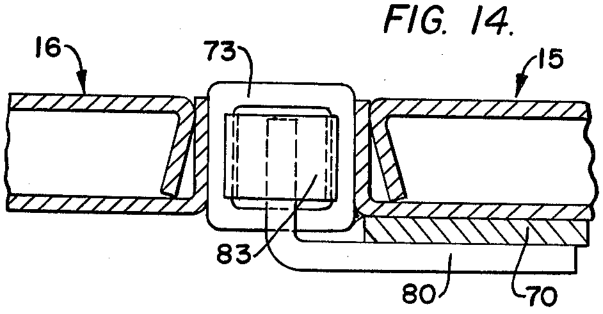
FIG. 14 is a transverse sectional view taken along the line 14—14 of FIG. 9.

Turning now to a more detailed description of the structure and operation of the bi-fold intermediate hinge assemblies 18 and intermediate lock assembly herewith generally designated 66, these features are most clearly illustrated in FIGS. 9 through 15 of the drawings. Each of the plurality of bi-fold hinge assemblies 18 comprises a plurality of hinge knuckles 67 vertically aligned and alternately secured to the adjacent inner and outer panels 15 and 16 such as by welding thereto as indicated at 68. A separate hinge or pivot pin 69 is disposed through the stacked hinge knuckles 67 of each assembly 18 and as shown in FIG. 12 of the drawings is offset inwardly from a central transverse plane through the adjacent door panels to allow of the compacted folded relationship of each pair of associated door panels when their respective inside faces **15*b* and 16*b* are juxtaposed as in FIG. 15**.

The intermediate lock assembly 66 provides structure serving to positively retain each pair of adjacent door panels 15 and 16 in a locked co-planar disposition when in the closed position without recourse to any other structure associated with the vehicle framing or decks. This assembly includes a lock actuating bar 70 slidably disposed upon the outside face **15*a* of the inner panel 15 and mounted for vertical displacement thereupon through a lower lift bar guide means 71 and an upper lift bar guide means 72 (FIG. 1). As previously described, a vertical clearance 21 exists between the plurality of hinge assemblies 18 and located within two separate such clearances 21 are a similar number of bolt guide housings 73 and 74. These guide housings are preferably of rectangular hollow configuration and are affixed such as by welding to the outer edge 19 of the inner panel 15 immediately adjacent the lateral edge of the vertically disposed lock actuating bar 70 while a similar pair of hollow rectangular housings 75 and 76, designated bolt lock housings, are located immediately beneath the housings 73 and 74 respectively but are secured to the inner edge 20 of the outer panel 16**.

Figure 9:
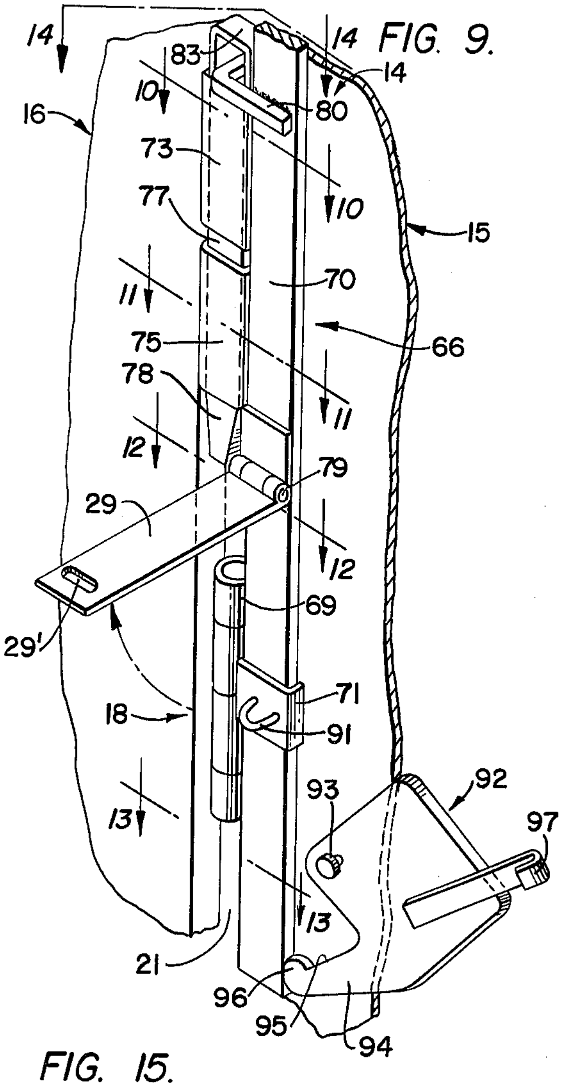
FIG. 9 is an enlarged fragmentary perspective view of the intermediate lock assembly and hinge means disposed between the adjacent edges of each pair of door assembly panels.
Figure 10:
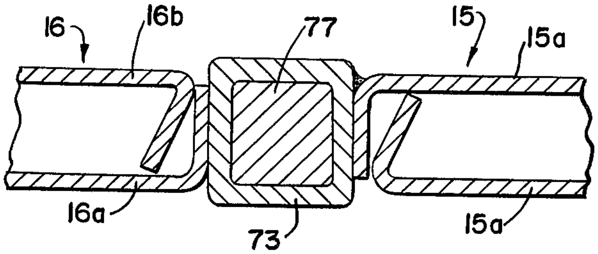
FIG. 10 is a transverse sectional view taken along the line 10—10 of FIG. 9.
Figure 11:
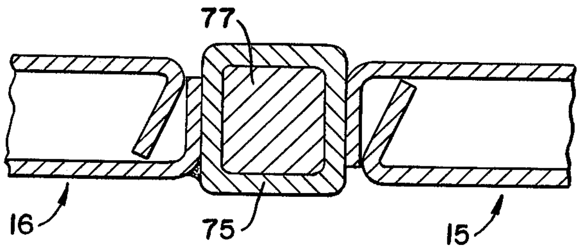
FIG. 11 is a transverse sectional view taken along the line 11—11 of FIG. 9.

The function of the above described structure will be most readily apparent upon a view of FIG. 9 wherein it will be seen that when the door panels 15 and 16 are in the closed, co-planar position the similarly configured guide housings 73, 74 and their respective lock housings 75, 76 are vertically aligned such that two bolts 77 having a cross-sectional configuration forming a sliding mating fit within the interior of the housings 73, 74 and 75, 76 may be readily passed through the interior of each pair of the two housings. The position shown in FIG. 9 of the drawings reflects the disposition of one of the bolts 77 when the lock assembly 66 is in the fully lowered or locked condition, wherein it will be seen that the nose 78 of the bolt 77 is projecting from the lower portion of the bolt lock housing 76 and in this position the two adjacent panels 15 and 16 are securely retained in a co-planar relationship.

Figure 15:
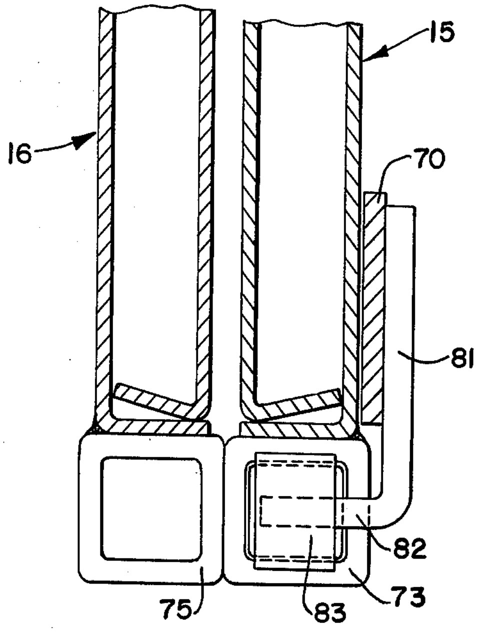
FIG. 15 is a transverse sectional view illustrating the relationship of the intermediate lock assembly components appearing in FIG. 14 wherein the two door panels of a door assembly are folded into the collapsed position.

When it is desired to release or unlatch the intermediate lock assembly 66 so as to fold the two door panels preparatory to moving the door assembly 14 into the storage position the operator grasps the handle 29 which is preferably attached such as by a pivot 79 to the actuating bar 70, after which a simple upward force applied to the handle 29 will vertically displace the actuating bar 70 and similarly vertically displace a pair of transverse lift members 80–81 to produce a corresponding vertical displacement of both bolts 77 in order to completely remove the bolts from within the confines of the lowermost bolt lock housings 75 and 76. The lift member preferably comprises an attaching element 81 affixed to the face of the lock actuating bar 70 and from which rearwardly extends a hook element 82. This hook element 82 at all times is disposed within a bolt catch 83 secured to the upper end of each of the bolts 77. From the foregoing it will be seen that any vertical displacement of the lock actuating bar 70 causes a corresponding vertical displacement of the two bolts 77, while merely releasing upward pressure upon the handle 29 will permit the lock actuating bar 70 and the two respective bolts 77 to fall by gravity to the normal at rest position such as shown in FIG. 9 of the drawings, when the door panels are disposed co-planar to align the interiors of the respective housings. Obviously, once the intermediate lock assembly 66 has been actuated to unlock a pair of panels 15 and 16 it would not be desirable to subsequently allow the two bolts 77 to drop to their lowermost position when the doors are folded and being moved into and out from the storage position since subsequent displacement of the door assembly to a closed position would be precluded when a lowered bolt 77 struck the exterior of its respective bolt lock housing 75, 76 and accordingly blocking means, which will be described hereinafter, are provided so that when the doors are in the folded position as shown in FIG. 15 of the drawings, the ends of the bolt noses 78 will be retained above the plane of the top of the respective lock housings 75 and 76.

With the top 14' of the end enclosure 1 of the present invention extending only to a height approximating that of the car side top edges 10 it will be apparent that a security problem would normally still exist due to the exposed roof access or clearance 84, particularly in the area adjacent the uppermost exterior ladder steps 85 and hand holds 86 and as bounded by the door top edge 14' and roof side sections 9. Accordingly, blockage means in the form of a security panel 87 is fixedly attached by suitable bracket means 88 above the top of each outer panel 16 as shown in FIG. 1. The security panels 87 are mounted in an inwardly inclined manner corresponding to the inclination of the angled roof side sections 9 so that when the door assemblies 14 are slidably displaced into the stored position as shown, the panel 87 will be parallel and juxtaposed the interior of the roof portion 9. By providing a space 88' beneath each panel 87 clearance is offered to allow the bottom edge 89 of the panel to pass over the fixed plate 25 supporting the overhead track member 24.

The two door assemblies 14 are further confined in the closed position by means of catch means on each deck 11, 12 such as the T-bar 90 including laterally directed arms behind which each inner panel inner edge 28 is disposed while unauthorized opening of the thus closed door assemblies is precluded by the provision of suitable retaining means such as the staple 91 for engaging and immobilizing the handle 29 of the lock actuating bar 70. Following insertion of the staple 91 through the handle or hasp slot 29' an appropriate seal or padlock may be applied through the staple 91.

Returning now to the referenced blocking means for retaining the bolts 77 in the elevated position removed from the lock housings 75, 76, it will be seen from FIGS. 1 and 9 that a gravity catch member 92 is pivotally attached, as at 93, to the exterior of the inner door panel 15 and adjacent the vertically displaceable bar 70. A catch bar 94 extends laterally from the body of the catch member and includes an upper, lock bar engaging surface 95 bounded by an enlarged contact nose 96.

With the above structure in mind it will be seen that when the intermediate lock mechanism is in the secured position the gravity catch member 92 will appear as shown in full lines in FIGS. 1 and 9 with its contact nose 96 engaging the edge of the lock bar 70, yet when the lock bar is actuated and the bolts 77 removed from within their respective lock bolt housings 75 and 76 the bottom edge of the lock bar 70 will be elevated to a point just below the pivot 93 of the gravity catch member 92 and by reason of the bulk of the mass of the catch member being disposed to the right of the pivot 93, the catch member will pivot by gravity to the broken line position of FIG. 1 with its catch bar 94 disposed immediately beneath the lock bar 70 so that subsequent release of the handle 29 of the lock bar will mean that the weight of the lock bar and its attached structure will be supported by and retained in the elevated position by means of the gravity catch member 92. Consequently, when it is desired to lock a door assembly in the co-planar closed position the operator merely engages the lock bar handle 29 with one hand and the handle 97 of the catch member with the other hand, following which the catch member may be pivoted about its point 93 to clear its catch bar 94 from beneath the lock bar 70 so that the intermediate lock assembly may be lowered to its secured position.

We claim:

1. An end enclosure for a transport vehicle having a floor and two side walls defining an end opening therebetween including, a pair of door assemblies each having an inner door panel and an outer door panel, each said panel provided with an outside face and an inside face and having an inner edge and an outer edge, intermediate hinge means pivotally joining the respective inner edge of each said outer panel to the respective outer edge of each said inner panel of each said door assembly in a manner providing a vertically extending clearance therebetween and whereby said inner and outer panels may be folded into a juxtaposed parallel condition, slidable vertically disposed hinge means carried by each said outer panel adjacent its outer edge, hanger means within said vehicle adjacent each said side wall and connected to said slidable hinge means, track means fixedly disposed within said vehicle and extending longitudinally of each said side wall, each said hanger means supported by a respective one of said track means to permit sliding displacement of said folded door assemblies to and from a stored position within said vehicle in a direction parallel to said side wall, intermediate lock means carried by each said door panel adjacent said vertically extending clearance and independently operable to lock each said pair of joined door panels to one another in a co-planar position as when disposed in a closed position normal to said vehicle side walls and storage lock means carried by said vehicle and operable to engage and retain said folded door assemblies in said stored position within said vehicle.

2. An end enclosure according to claim 1 wherein, said track means includes a guide member containing a plurality of trolley units, and said hanger means includes a horizontally disposed hanger member suspended from said trolley units.

3. An end enclosure according to claim 1 including, stretchable spring means connecting each said door assembly to said vehicle and applying a constant inward force to said panels when in said closed position.

4. An end enclosure according to claim 1 including, a bottom door guide member adjacent each said side wall and extending within said vehicle parallel said side walls, said slidable hinge means including a hinge rod having a bottom guide rod confined within said door guide member and said storage lock means includes displaceable bolt means automatically engaging said bottom guide rod when each said door assembly and its respective hinge rod are slidably displaced fully within said vehicle.

5. An end enclosure according to claim 4 wherein, said storage lock means includes an actuating rod disposed parallel to said door guide member, means pivotally mounting said actuating rod, an offset actuating portion extending from said actuating rod and engageable with said bolt means and handle means operable to displace said bolt means to permit retraction of said hinge rod.

6. An end enclosure according to claim 1 wherein, said vehicle includes a roof disposed above the height of said door assemblies and providing a roof clearance therebetween, and a security panel affixed to and extending above each said outer door panel to block out a substantial portion of said roof clearance adjacent said car side walls when said door assemblies are in the closed position.

7. An end enclosure according to claim 6 wherein, said roof includes side sections adjacent said car side walls and inclined relative thereto and said security panels are similarly inclined whereby, when said folded door assemblies are displaced into said stored position said security panels are juxtaposed and parallel said roof side sections within said roof clearance.

8. An end enclosure according to claim 1 wherein, said intermediate hinge means comprises a plurality of vertically spaced apart hinge assemblies with one said clearance between each adjacent pair thereof, said intermediate lock means including at least one lock bolt disposed within one said clearance when said panels are co-planar, lift means for vertically displacing said bolt, and a lock housing carried by one said panel whereby, said bolt is displaceable by said lift means to engage said lock housing to lock said panels of said door assembly when co-planar with one another.

9. An end enclosure according to claim 8 wherein, each said hinge assembly includes a plurality of knuckles alternately secured to said respective adjacent panel edges, a hinge pin joining said knuckles of each said hinge assembly, said hinge pin center axis disposed beyond the transverse plane of said door panels juxtaposed the plane of said inside face thereof whereby, when said intermediate lock means is released and said panels folded said outer panel inside face is juxtaposed said inner panel inside face.

10. An end enclosure according to claim 8 including, a plurality of said lock bolts each disposed within a separate one of said clearances.

11. An end enclosure according to claim 8 including, a handle pivotally attached to said lift means and retaining means fixed relative one said panel engageable with said handle when said lock bolt engages said lock housing to preclude displacement of said lift means.

12. An end enclosure according to claim 8 wherein, said vehicle includes at least one elevated deck extending between said side walls to said end opening, catch means on the end of said deck intermediate said end opening width whereby, said door assemblies when in the closed position have their inner edges engaged by said catch means.

13. An end enclosure according to claim 8 wherein, said lift means includes a lock actuating bar mounted upon one said panel outside face for vertical displacement adjacent said clearances, a bolt guide housing within one said clearance affixed to said panel supporting said lock bar, said lock bolt contained within said guide housing and said bolt and lock housing are configured whereby when said lock bar is displaced to move a portion of said bolt from said guide housing into said lock housing said bolt precludes angular movement between said bolt, both said housings and therefor both said panels.

14. An end enclosure according to claim 13 wherein, each said bolt guide housing and lock housing are affixed to separate ones of said pivotally joined door panels and are vertically aligned only when said joined door panels are co-planar.

15. An end enclosure according to claim 13 including, a gravity catch member pivotally attached to one said panel adjacent said lock bar and automatically pivotal to engage and retain said lock bar when elevated to remove said bolt from said lock housing.

* * * * *